(12) United States Patent
Nishimiya et al.

(10) Patent No.: US 12,507,619 B2
(45) Date of Patent: Dec. 30, 2025

(54) PATH GENERATION DEVICE, PATH GENERATION METHOD, AND PROGRAM

(71) Applicant: HONDA MOTOR CO., LTD., Tokyo (JP)

(72) Inventors: Kenji Nishimiya, Wako (JP); Nikunj Shah, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 492 days.

(21) Appl. No.: 18/088,895

(22) Filed: Dec. 27, 2022

(65) Prior Publication Data

US 2024/0206380 A1 Jun. 27, 2024

(51) Int. Cl.
*A01D 34/00* (2006.01)
*A01D 101/00* (2006.01)
*G05D 1/00* (2024.01)

(52) U.S. Cl.
CPC ......... *A01D 34/008* (2013.01); *G05D 1/0219* (2013.01); *A01D 2101/00* (2013.01)

(58) Field of Classification Search
CPC . A01D 34/008; A01D 2101/00; G05D 1/0219
See application file for complete search history.

(56) References Cited

U.S. PATENT DOCUMENTS

2020/0275605 A1\* 9/2020 Chen ...................... G01S 19/53

FOREIGN PATENT DOCUMENTS

JP 2022-083886 6/2022

\* cited by examiner

*Primary Examiner* — Alan D Hutchinson
(74) *Attorney, Agent, or Firm* — Amin, Turocy & Watson, LLP

(57) ABSTRACT

A path generation device, a path generation method, and a program capable of improving the work efficiency of a work machine by generating an efficient path are provided. The path generation device (10) includes a processing unit (13) that generates a path for a work machine (300). The processing unit (13) divides a work area set for the work machine (300) by a plurality of straight lines having different angles relative to a reference angle. The processing unit (13) divides the work area by a straight line having an angle that minimizes the number of subdivided regions generated by dividing the work area among the plurality of straight lines for area division to generate the path.

14 Claims, 8 Drawing Sheets

PATH GENERATION DEVICE, PATH GENERATION METHOD, AND PROGRAM

BACKGROUND OF THE INVENTION

Field of the Invention

The present invention relates to a path generation device, a path generation method, and a program.

Description of Related Art

For example, a work path determination device that divides, when there is an obstacle in a work area, the work area by straight lines contacting the obstacle to create a plurality of subdivided regions and sequentially selects the plurality of subdivided regions to set a work path is known in the related art (see, for example, Patent Document 1).

PATENT DOCUMENTS

[Patent Document 1] Japanese Unexamined Patent Application, First Publication No. 2022-083886

SUMMARY OF THE INVENTION

Incidentally, the work path determination device in the related art described above divides a work area by straight lines contacting an obstacle to create a plurality of subdivided regions not only when it is a rectangular obstacle but also when it is a polygonal or irregularly shaped obstacle. However, a plurality of different straight lines parallel to a plurality of different directions can be selected as straight lines contacting an obstacle and the method of dividing a work area, that is, the number and shapes of subdivided regions, may differ for different straight lines. Thus, there is a problem that it is difficult to set an efficient path or improve work efficiency with the process of simply dividing a work area by straight lines contacting an obstacle.

It is an object of the present invention to provide a path generation device, a path generation method, and a program that can improve the work efficiency of a work machine by generating an efficient path.

To solve the above problem and achieve the object, the present invention adopts the following aspects.

(1) A path generation device (10) according to an aspect of the present invention includes a processing unit (13, 40, 200) configured to, when dividing a work area set for a work machine (300) by a plurality of straight lines having different angles relative to a reference angle, divide the work area by a straight line having an angle that minimizes the number of subdivided regions generated by dividing the work area among the plurality of straight lines to generate a path for the work machine.

(2) In the path generation device according to (1) above, the processing unit may be configured to set an integrated region obtained by integrating a plurality of predetermined adjacent subdivided regions among the plurality of subdivided regions as a new subdivided region and divide the work area by a straight line having an angle that minimizes the number of subdivided regions to generate a path for the work machine.

(3) In the path generation device according to (1) above, the processing unit may be configured to divide the work area by the plurality of straight lines which are at predetermined angular intervals from 0° to 180° relative to the reference angle.

(4) In the path generation device according to any one of (1) to (3) above, the processing unit may be configured to generate a path in a subdivided region generated by dividing the work area parallel to a straight line having an angle that minimizes the number of subdivided regions among the plurality of straight lines.

(5) In the path generation device according to (4) above, the processing unit may be configured to set an end of the subdivided region in a direction orthogonal to the straight line having the angle that minimizes the number of subdivided regions as a start point of the path in the subdivided region.

(6) In the path generation device according to (1) above, the processing unit may be configured to, when dividing the work area by each of the plurality of straight lines, exclude the number of regions, which are generated by dividing the work area and whose areas are smaller than a predetermined threshold, from the number of subdivided regions.

(7) A path generation device (10) according to an aspect of the present invention includes a processing unit (13, 40, 200) configured to, when dividing a work area set for a work machine (300) by a plurality of straight lines having different angles relative to a reference angle, generate a path for the work machine in a subdivided region generated by dividing the work area, parallel to a straight line having a predetermined angle corresponding to the number of subdivided regions generated by dividing the work area among the plurality of straight lines.

(8) In the path generation device according to (7) above, the processing unit may be configured to divide the work area by a straight line having an angle that minimizes the number of subdivided regions among the plurality of straight lines to generate a path for the work machine.

(9) In the path generation device according to (7) above, the processing unit may be configured to set an integrated region obtained by integrating a plurality of predetermined adjacent subdivided regions among the plurality of subdivided regions as a new subdivided region and divide the work area by a straight line having an angle that minimizes the number of subdivided regions to generate a path for the work machine.

(10) In the path generation device according to (7) above, the processing unit may be configured to divide the work area by the plurality of straight lines which are at predetermined angular intervals from 0° to 180° relative to the reference angle.

(11) In the path generation device according to (7) above, the processing unit may be configured to set an end of the subdivided region in a direction orthogonal to the straight line having the angle that minimizes the number of subdivided regions as a start point of the path in the subdivided region.

(12) In the path generation device according to (7) above, the processing unit may be configured to, when dividing the work area by each of the plurality of straight lines, prevent the number of subdivided regions from including the number of regions which are generated by dividing the work area and whose areas are smaller than a predetermined threshold.

(13) A path generation method according to an aspect of the present invention is a path generation method performed by an electronic device (100, 200, 300) including a processing unit (13, 40, 200) configured to generate a path for a work machine (300), the path generation method including the electronic device dividing, when dividing a work area set for the work machine by a plurality of straight lines having different angles relative to a reference angle, the work area by a straight line having an angle that minimizes the number of subdivided regions generated by dividing the work area among the plurality of straight lines to generate the path (steps S08 and S09).

(14) A path generation method according to an aspect of the present invention is a path generation method performed by an electronic device (100, 200, 300) including a processing unit (13, 40, 200) configured to generate a path for a work machine (300), the path generation method including the electronic device generating, when dividing a work area set for the work machine by a plurality of straight lines having different angles relative to a reference angle, the path in a subdivided region generated by dividing the work area, parallel to a straight line having a predetermined angle corresponding to the number of subdivided regions generated by dividing the work area among the plurality of straight lines (step S09).

(15) A program according to an aspect of the present invention causes a computer for an electronic device (100, 200, 300) including a processing unit (13, 40, 200) configured to generate a path for a work machine (300) to perform dividing, when dividing a work area set for the work machine by a plurality of straight lines having different angles relative to a reference angle, the work area by a straight line having an angle that minimizes the number of subdivided regions generated by dividing the work area among the plurality of straight lines to generate the path (steps S08 and S09).

(16) A program according to an aspect of the present invention causes a computer for an electronic device (100, 200, 300) including a processing unit (13, 40, 200) configured to generate a path for a work machine (300) to perform generating, when dividing a work area set for the work machine by a plurality of straight lines having different angles relative to a reference angle, the path in a subdivided region generated by dividing the work area, parallel to a straight line having a predetermined angle corresponding to the number of subdivided regions generated by dividing the work area among the plurality of straight lines (step S09).

According to (1) above, by minimizing the number of subdivided regions, it is possible to limit an increase in the distance of non-work paths (movement paths) other than the distance of work paths (paths for work) among the distance of the path of the work machine, thus improving work efficiency.

In the case of (2) above, by integrating a plurality of predetermined adjacent subdivided regions into a new subdivided region, it is possible to limit an increase in the number of subdivided regions and an increase in the distance of movement paths.

In the case of (3) above, by setting the angles of the straight lines for area division at predetermined angular intervals from 0° to 180°, it is possible to select a straight line having an optimal angle.

In the case of (4) above, by making the path in the subdivided region parallel to the straight line, it is possible, for example, to limit a decrease in the proportion of the subdivided region which can be covered by the path (the coverage), compared to when the path in the subdivided region is not parallel to the straight line.

In the case of (5) above, by setting the end of the subdivided region in the normal direction of the straight line that generates the subdivided region as the start point of the path, it is possible, for example, to limit the occurrence of an area that cannot be covered by the path in the subdivided region even though the path in the subdivided region is parallel to the straight line.

In the case of (6) above, for example, by excluding the number of small regions in which it is difficult for the work machine to perform work from the number of subdivided regions, it is possible to properly select a straight line having an angle that minimizes the number of subdivided regions.

According to (7) above, by making the path in the subdivided region parallel to the straight line for area division, it is possible, for example, to limit a decrease in the proportion of the subdivided region which can be covered by the path (the coverage), compared to when the path in the subdivided region is not parallel to the straight line.

According to (8) above, by minimizing the number of subdivided regions, it is possible to limit an increase in the distance of non-work paths (movement paths) other than the distance of work paths (paths for work) among the distances of the paths of the work machine, thus improving work efficiency.

In the case of (9) above, by integrating a plurality of predetermined adjacent subdivided regions into a new subdivided region, it is possible to limit an increase in the number of subdivided regions and an increase in the distance of movement paths.

In the case of (10) above, by setting the angles of the straight lines for area division at predetermined angular intervals from 0° to 180°, it is possible to select a straight line having an optimal angle.

In the case of (11) above, by setting the end of the subdivided region in the normal direction of the straight line that generates the subdivided region as the start point of the path, it is possible, for example, to limit the occurrence of an area that cannot be covered by the path in the subdivided region even though the path in the subdivided region is parallel to the straight line.

In the case of (12) above, for example, by excluding the number of small regions in which it is difficult for the work machine to perform work from the number of subdivided regions, it is possible to properly select a straight line having a predetermined angle corresponding to the number of subdivided regions.

According to (13) or (15) above, by minimizing the number of subdivided regions, it is possible to limit an increase in the distance of non-work paths (movement paths) other than the distance of work paths (paths for work) among the distances of the paths of the work machine, thus improving work efficiency.

According to (14) or (16) above, by making the path in the subdivided region parallel to the straight line for area division, it is possible, for example, to limit a decrease in the proportion of the subdivided region which can be covered by the path (the coverage), compared to when the path in the subdivided region is not parallel to the straight line.

DETAILED DESCRIPTION OF THE INVENTION

A path generation device according to an embodiment of the present invention will be described below with reference to the accompanying drawings.

The path generation device of the embodiment generates a movement path and a work path for a mobile work machine such as a grass cutter, a cleaner, an agricultural machine, or a snow remover that performs predetermined work while automatically or autonomously moving within a predetermined area.

Figure 1:
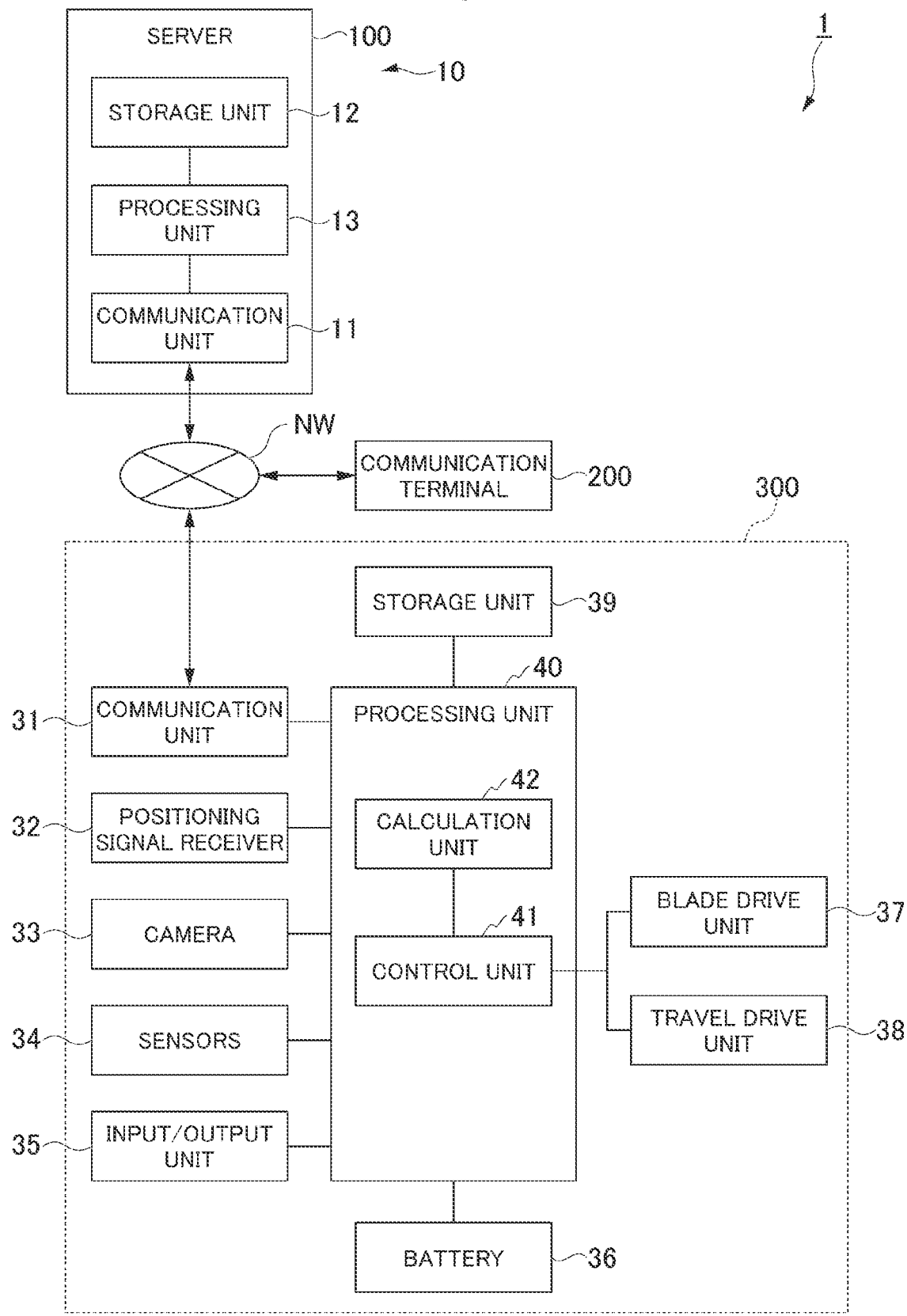
FIG. 1 is a diagram showing a configuration of a work system including a path generation device according to an embodiment of the present invention.

FIG. 1 is a diagram showing a configuration of a work system 1 including a path generation device 10 according to the embodiment.

As shown in FIG. 1, the work system 1 includes, for example, a server 100, a communication terminal 200, and a mobile work machine 300. The server 100, the communication terminal 200, and the mobile work machine 300 are connected, for example, via a wired or wireless communication network NW. The communication network NW is, for example, the Internet, a mobile communication network, a local area network (LAN), or a wide area network (WAN). The LAN is, for example, a wired LAN of a predetermined standard such as Ethernet or a wireless LAN of various standards such as Wi-Fi and Bluetooth (registered trademark).

The server 100 includes, for example, a communication unit 11, a storage unit 12, and a processing unit 13. The storage unit 12 and the processing unit 13 of the server 100 constitute, for example, the path generation device 10 of the embodiment.

The communication unit 11 communicates, for example, with the communication terminal 200 and the mobile work machine 300.

The storage unit 12 stores, for example, various types of information and predetermined programs.

The processing unit 13 includes a software functional unit that functions by a processor such as a central processing unit (CPU) executing a predetermined program. The software functional unit is an electronic control unit (ECU) that includes a processor such as a CPU, a read only memory (ROM) for storing programs, a random access memory (RAM) for temporarily storing data, and an electronic circuit such as a timer. At least a part of the processing unit 13 may be an integrated circuit such as a large scale integration (LSI).

The communication terminal 200 is, for example, a mobile information terminal such as a smartphone, a tablet terminal, or a personal computer. The communication terminal 200 is connected to the server 100 and the mobile work machine 300, for example, via the communication network NW and transmits and receives various types of information.

The mobile work machine 300 is, for example, a grass cutter that cuts grass while automatically or autonomously moving within an appropriate work area. The mobile work machine 300 includes, for example, a communication unit 31, a positioning signal receiver 32, a camera 33, sensors 34, an input/output unit 35, a battery 36, a blade drive unit 37, a travel drive unit 38, a storage unit 39, and a processing unit 40. The processing unit 40 includes, for example, a control unit 41 and a calculation unit 42.

The communication unit 31 communicates, for example, with the server 100 and the communication terminal 200.

The positioning signal receiver 32 includes, for example, an antenna for a satellite positioning system (a global navigation satellite system (GNSS)) such as a global positioning system (GPS). The positioning signal receiver 32 detects the current position or the like of the mobile work machine 300 based on a positioning signal received by the antenna and outputs a detection signal to the processing unit 40.

The camera 33 is, for example, a digital camera including a solid-state imaging device such as a charge coupled device (CCD) or a complementary metal oxide semiconductor (CMOS). The camera 33 outputs image data, which is obtained by imaging an external world including an area in front of the mobile work machine 300, for example, in visible and infrared ranges, to the processing unit 40.

The sensors 34 include, for example, an acceleration sensor that detects the acceleration of the mobile work machine 300, a gyro sensor that detects the pitch, roll, yaw, or the like of the mobile work machine 300, and a voltage sensor, a current sensor, and a temperature sensor that detect the states of the battery 36. The sensors 34 output detection signals to the processing unit 40.

The input/output unit 35 includes, for example, an input/output device that is a user interface, connection terminals for supplying and receiving power, and connection terminals for connection to various external devices. The input/output device includes, for example, a display device such as a liquid crystal display or an organic electroluminescence (EL) display, an input device such as a button or a touch panel that receives an input operation performed by the operator's fingers, a microphone for audio input, and a speaker for audio output.

The battery 36 includes, for example, a plurality of battery cells connected in series or in parallel. Each battery cell is, for example, a secondary battery such as a lead-acid battery, a lithium ion battery, a sodium ion battery, a nickel-metal hydride battery, or an all-solid-state battery, a capacitor such as an electric double layer capacitor, or a composite battery that combines a secondary battery and a capacitor. The battery cells are repeatedly charged and discharged.

The blade drive unit 37 includes, for example, an electric motor that outputs power to drive a grass cutting blade (not shown).

The travel drive unit 38 includes, for example, an electric motor that outputs power for traveling and a power transmission mechanism that transmits power of the electric motor to drive wheels.

The storage unit 39 stores, for example, various types of information and predetermined programs.

The processing unit 40 includes a software functional unit that functions by a processor such as a central processing unit (CPU) executing a predetermined program. The software functional unit is an electronic control unit (ECU) that includes a processor such as a CPU, a read only memory (ROM) for storing programs, a random access memory (RAM) for temporarily storing data, and an electronic circuit such as a timer. At least a part of the processing unit 40 may be an integrated circuit such as a large scale integration (LSI).

The control unit 41 controls the operation of the mobile work machine 300, for example, based on information acquired from the communication unit 31, the positioning signal receiver 32, the camera 33, the sensors 34, the input/output unit 35, and the storage unit 39.

The calculation unit 42 performs various calculation processing, for example, based on information acquired from the communication unit 31, the positioning signal receiver 32, the camera 33, the sensors 34, the input/output unit 35, and the storage unit 39.

Operation of Work System

The operation of the work system 1 of the embodiment will be described below.

Figure 2:
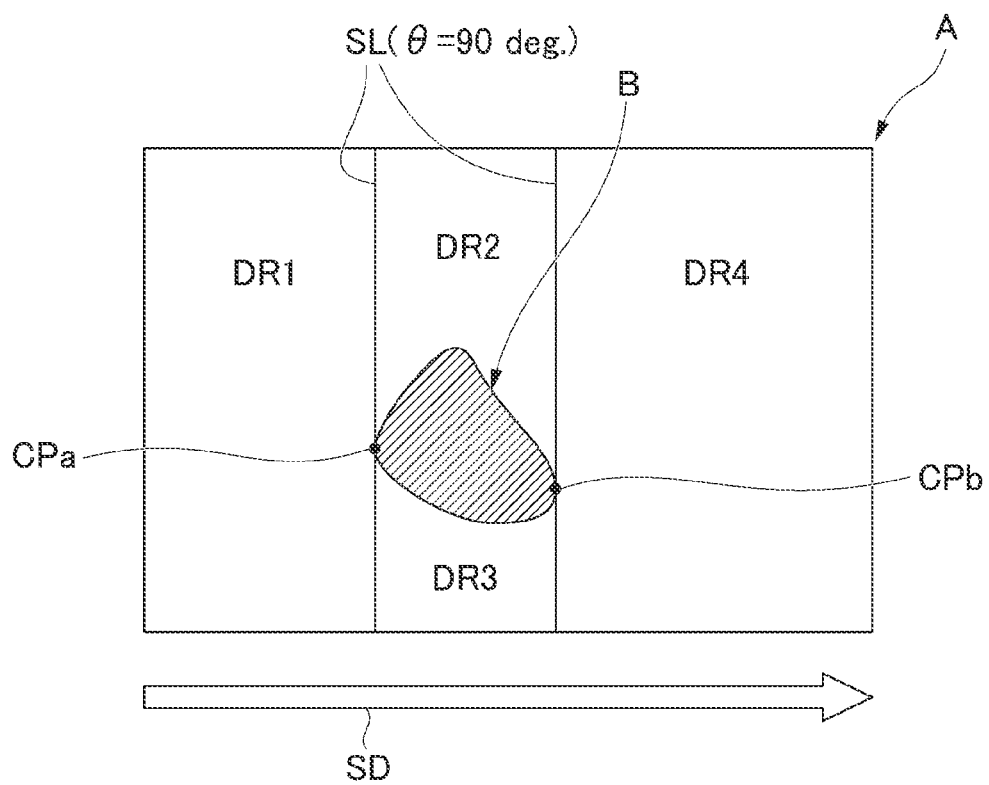
FIG. 2 is a diagram showing an example of division of a work area by the path generation device according to the embodiment of the present invention.
Figure 3:
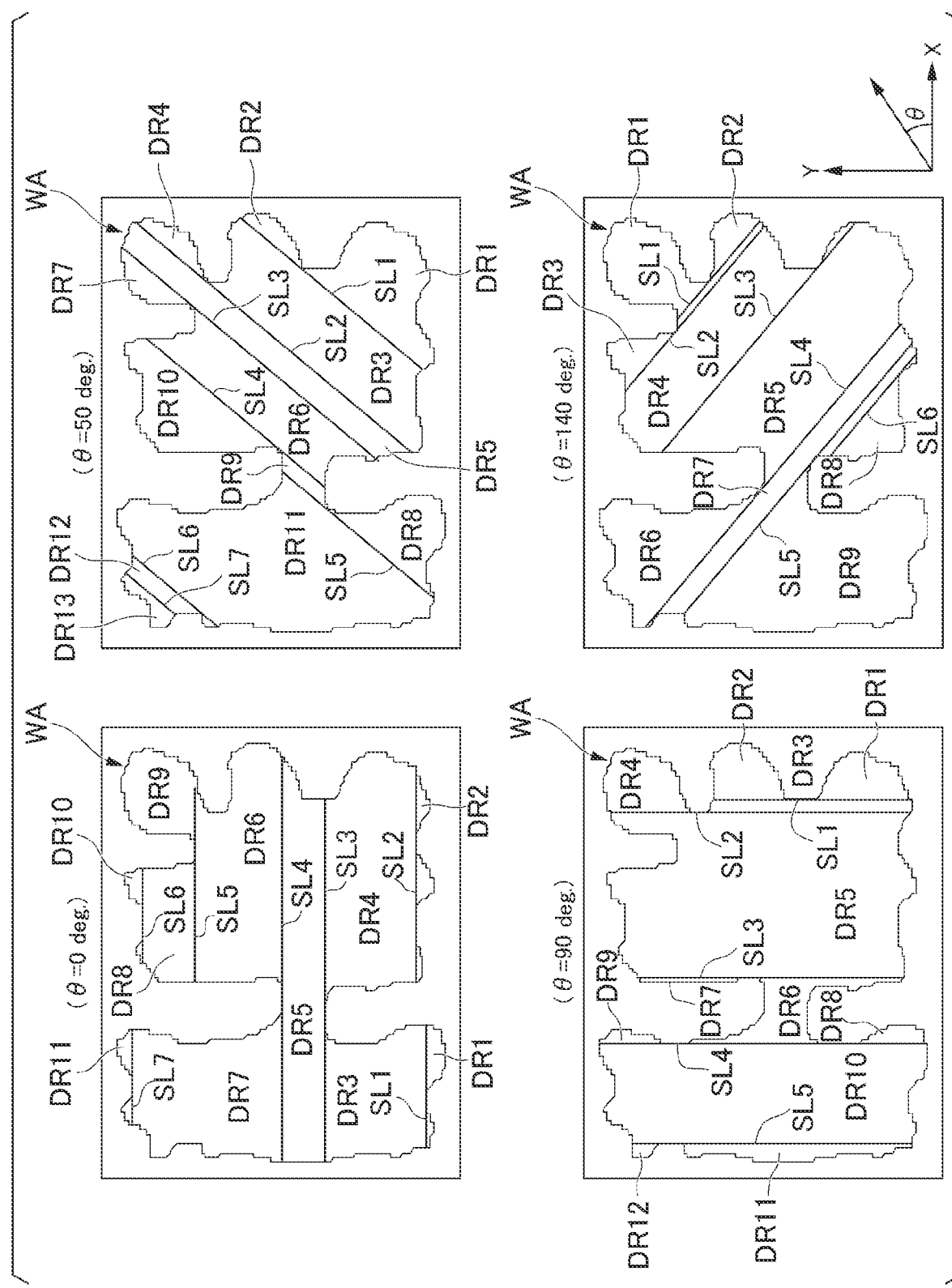
FIG. 3 is a diagram showing examples of division of an area according to sweep angles by the path generation device according to the embodiment of the present invention.
Figure 4:
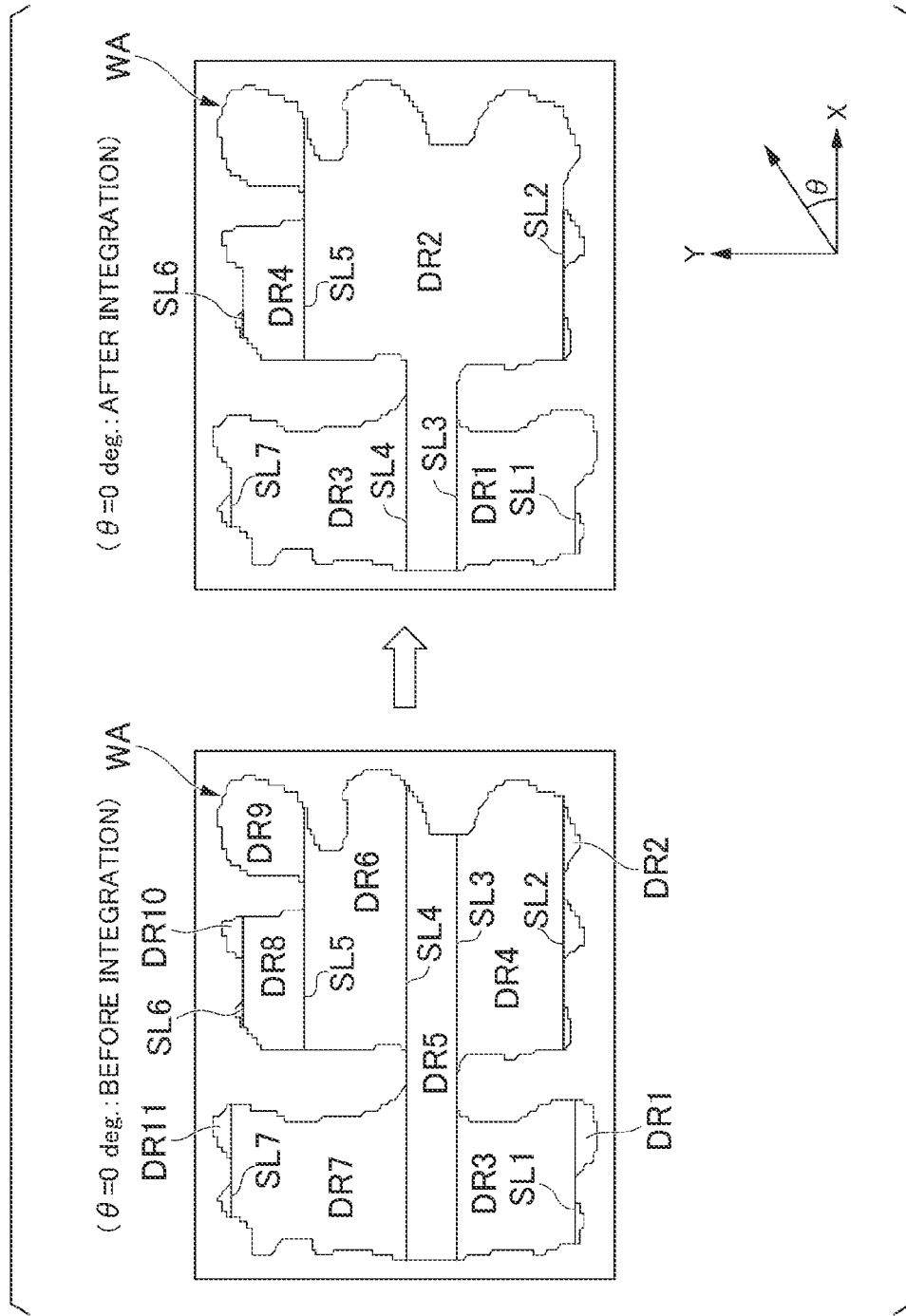
FIG. 4 is a diagram showing an example of integration of subdivided regions by the path generation device according to the embodiment of the present invention.
Figure 5:
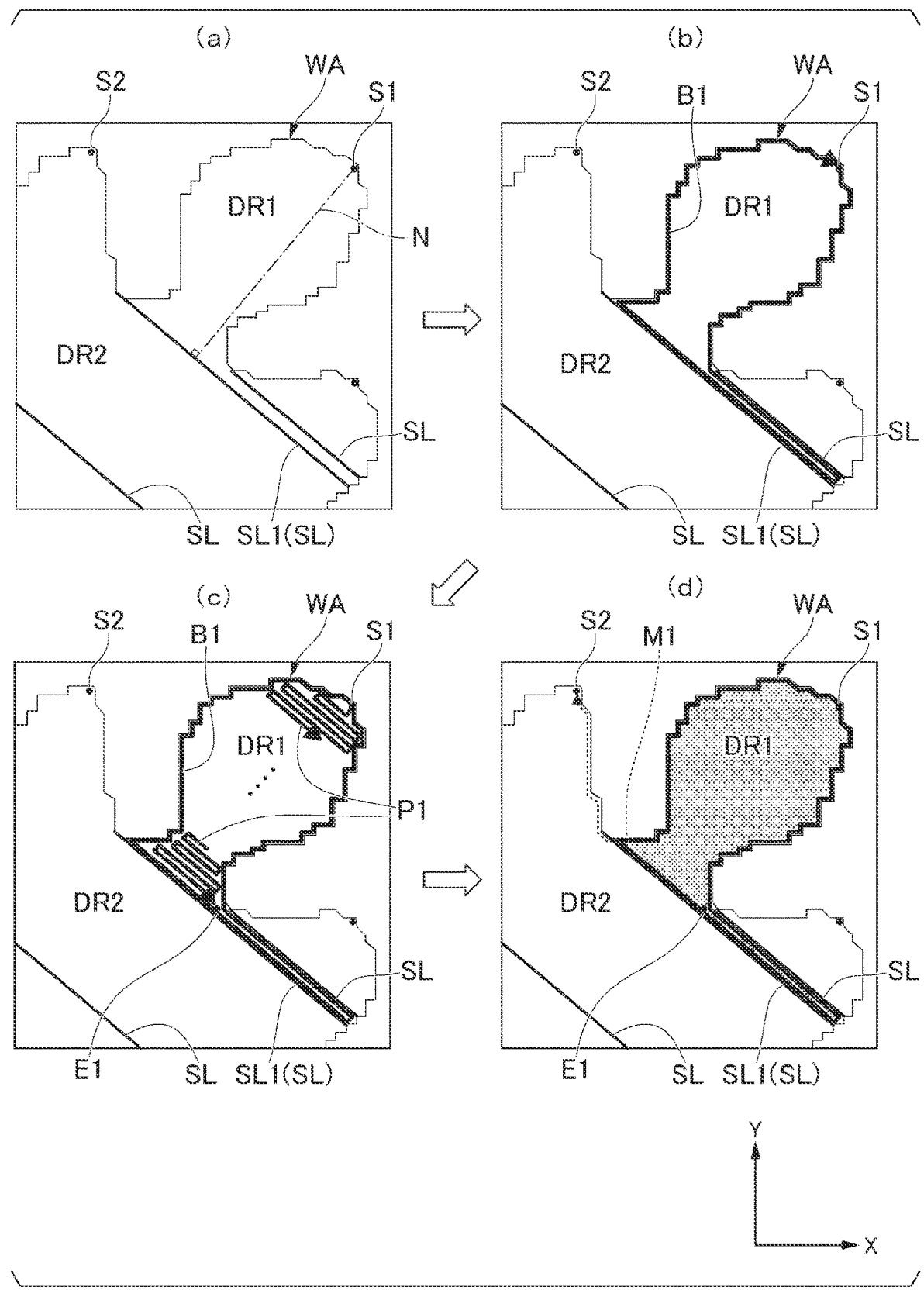
FIG. 5 is a diagram showing examples of starting points (a) set by the path generation device according to the embodiment, a work path (b) on the boundary of a subdivided region, a work path (c) within the subdivided region, and a movement path (d) between subdivided regions.

FIG. 2 is a diagram showing an example of division of a work area by the path generation device 10 according to the embodiment. FIG. 3 is a diagram showing examples of division of an area according to sweep angles θ by the path generation device 10 according to the embodiment. FIG. 4 is a diagram showing an example of integration of subdivided regions by the path generation device 10 according to the embodiment. FIG. 5 is a diagram showing examples of starting points (a) set by the path generation device 10 according to the embodiment, a work path (b) on the boundary of a subdivided region, a work path (c) within the subdivided region, and a movement path (d) between subdivided regions.

As shown in FIG. 2, the directions of X and Y axes, which are orthogonal to each other in a two-dimensional space, are parallel respectively to the X and Y axes. For example, the X-axis direction is parallel to a lateral direction of map data and the Y-axis direction is parallel to a vertical direction of the map data. An appropriate sweep angle θ is, for example, an angle relative to a predetermined reference angle. The predetermined reference angle is, for example, 0° corresponding to a positive direction of the X axis. That is, the appropriate sweep angle θ is, for example, an angle formed with respect to the positive direction of the X axis.

An outline of the operation of the work system 1 will be described.

As shown in FIGS. 2 to 5, the path generation device 10 determines the boundary of a work area and obstacles within the work area based on the map data of the work area. The path generation device 10 performs work area division (decomposition) and integration (merging) as necessary, such that a work area is constituted by a plurality of subdivided regions. After setting a path along which the mobile work machine 300 is to work (a work path) in each subdivided region, the path generation device 10 sets the work order of the plurality of subdivided regions and paths required for movement between the plurality of subdivided regions (movement paths) to generate a path that is continuous over the entire work area (a continuous path). For example, when setting the work order of a plurality of subdivided regions, the path generation device 10 sets a subdivided region, which has a start point closest to an end point of a work path of an appropriate subdivided region, as a subdivided region to be worked next to the appropriate subdivided region.

In each subdivided region, first, the mobile work machine 300 performs work while moving along an inner peripheral edge (an inner edge) along the boundary of the subdivided region. Next, the mobile work machine 300 performs work while moving along predetermined work path throughout the inside of the subdivided region.

Then, the mobile work machine 300 moves to the next subdivided region to be worked along a movement path according to the work order. The mobile work machine 300 repeatedly performs work in each subdivided region and movement between a plurality of subdivided regions until it completes work in a last subdivided region in the work order.

Details of the operation of the path generation device 10 will be described.

As shown in FIG. 2, the path generation device 10 divides a work area A through processing of so-called Morse-based boustrophedon cellular decomposition. For example, the path generation device 10 sets a sweep direction SD corresponding to a predetermined sweep angle θ for the work area A and moves a straight sweep line SL whose normal direction is the predetermined sweep direction SD along the sweep direction SD. For example, the sweep angle θ is the angle between the straight sweep line SL and the positive direction of the X axis and the sweep direction SD is the normal direction of the straight sweep line SL.

The path generation device 10 detects a critical point at which the connectivity of the straight sweep line SL changes due to an area other than the work area A such as an obstacle B or the outside of the work area A, that is, a position at which the straight sweep line SL touches the boundary of the area other than the work area A.

In the example shown in FIG. 2, the sweep angle θ of the straight sweep line SL is 90°. First, the path generation device 10 forms a first subdivided region DR1 until the straight sweep line SL reaches a first critical point CPa at which it touches the boundary of the obstacle B. Next, the path generation device 10 forms a second subdivided region DR2 and a third subdivided region DR3 until the straight sweep line SL reaches a second critical point CPb at which it touches the boundary of the obstacle B while being cut by the boundary of the obstacle B. Next, the path generation device 10 forms a fourth subdivided region DR4 starting from the second critical point CPb at which the cutting of the straight sweep line SL by the boundary of the obstacle B ends.

With map data of a work area WA, the path generation device 10 divides the work area WA for each of a plurality of different sweep directions as shown in FIG. 3. For example, the path generation device 10 sets sweep angles θ at intervals of 10° from 0° to 180° and sets a plurality of subdivided regions for each sweep angle θ.

In the example shown in FIG. 3, for the sweep angle θ=0°, the path generation device 10 divides the work area WA into eleven subdivided regions DR (first to eleventh subdivided regions DR1 to DR11) by seven straight sweep lines SL (first to seventh straight sweep lines SL1 to SL7).

For the sweep angle θ=50°, the path generation device 10 divides the work area WA into thirteen subdivided regions DR (first to thirteenth subdivided regions DR1 to DR13) by seven straight sweep lines SL (first to seventh straight sweep lines SL1 to SL7).

For the sweep angle θ=90°, the path generation device 10 divides the work area WA into twelve subdivided regions DR (first to twelfth subdivided regions DR1 to DR12) by five straight sweep lines SL (first to fifth straight sweep lines SL1 to SL5).

For the sweep angle θ=140°, the path generation device 10 divides the work area WA into nine subdivided regions DR (first to ninth subdivided regions DR1 to DR9) by six straight sweep lines SL (first to sixth straight sweep lines SL1 to SL6).

The number of subdivided regions DR is, for example, the number of subdivided regions DR having an area or a width dimension equal to or greater than a predetermined value.

After dividing the work area WA for each sweep angle θ, the path generation device 10 shortens the lengths of straight sweep lines SL to integrate a plurality of subdivided regions to create an integrated region and sets the obtained integrated region as a new subdivided region as shown in FIG. 4.

In the example shown in FIG. 4, after dividing the work area WA into eleven subdivided regions (first to eleventh subdivided regions DR1 to DR11) by seven straight sweep lines SL (first to seventh straight sweep lines SL1 to SL7) for the sweep angle θ=0°, the path generation device 10 shortens each straight sweep line SL to integrate a plurality of subdivided regions. For example, the path generation device 10 shortens the first straight sweep line SL1 to integrate the first subdivided region DR1 and the third subdivided region DR3 to set a new first subdivided region DR1. For example, the path generation device 10 shortens the second straight sweep line SL2, the third straight sweep line SL3, the fourth straight sweep line SL4, and the fifth straight sweep line SL5 to integrate the second subdivided region DR2, the fourth subdivided region DR4, the fifth subdivided region DR5, the sixth subdivided region DR6, and the ninth subdivided region DR9 to set a new second subdivided region DR2. For example, the path generation device 10 shortens the seventh straight sweep line SL7 to integrate the seventh subdivided region DR7 and the eleventh subdivided region DR11 to set a new third subdivided region DR3. For example, the path generation device 10 shortens the sixth straight sweep line SL6 to integrate the eighth subdivided region DR8 and the tenth subdivided region DR10 to set a new fourth subdivided region DR4.

As shown in FIG. 5, the path generation device 10 sets a starting point (a path start point) and an ending point (a path end point) for work, a work path, and a movement path for each subdivided region of the work area WA.

First, the path generation device 10 sets a starting point for work in the subdivided region. The path generation device 10 sets, for example, a position on an inner edge of the boundary which maximizes the distance from a straight sweep line SL forming the subdivided region (that is, the position of an end of the subdivided region in a normal direction of the straight sweep line SL) as a starting point. In the example shown in FIG. 5(a), the path generation device 10 sets, for example, an intersection which maximizes the distance from a first straight sweep line SL1 among the intersections of a normal line N of the first straight sweep line SL1 forming a first subdivided region DR1 and an inner edge of the boundary of the first subdivided region DR1 as a first starting point S1.

For example, when there are a plurality of positions (positions on the inner edge of the boundary) which maximize the distance from a straight sweep lines SL such as when a subdivided region is formed sandwiched by two parallel straight sweep lines SL from both sides in the normal direction, the path generation device 10 may set, for example, a position present on one of both end sides in a direction parallel to the straight sweep lines SL as a starting point.

Next, the path generation device 10 sets work paths in the subdivided region. For example, the path generation device 10 first sets an inner edge work path that follows the inner edge in a circle from the starting point along the boundary of the subdivided region and returns to the starting point. Next, the path generation device 10 sets an inner work path that meanders in a zigzag or wavy line from the starting point throughout the inside of the inner edge work path. The inner work path is, for example, a path that gradually moves away from the starting point along the normal direction of the straight sweep line by repeating straight paths parallel to the straight sweep line and turnaround paths that turn back at both ends of the straight path. The path generation device 10 sets the inner work path based on preset information such as a work width, a turning radius, and a work overlap width of the mobile work machine 300.

In the example shown in FIG. 5(b), the path generation device 10 sets, for example, a first inner edge work path B1 that follows the inner edge in a circle from the first starting point S1 along the boundary of the first subdivided region DR1. In the example shown in FIG. 5(c), the path generation device 10 sets, for example, a first inner work path P1 that meanders in a zigzag or wavy line from the first starting point S1 throughout the inside of the first inner edge work path B1 by combining straight paths parallel to the first straight sweep line SL1 and turnaround paths that turn back at both ends of the straight paths.

Next, the path generation device 10 sets an ending point for work in the subdivided region. For example, the path generation device 10 sets an end point of the inner work path at which the inner work path completes the covering (that is, the work) of the entire area inside the inner edge work path as the ending point. In the example shown in FIG. 5(c), the path generation device 10 sets, for example, the end point of the first inner work path P1 as a first ending point E1.

Next, the path generation device 10 sets movement paths between a plurality of subdivided regions. For example, the path generation device 10 sets each movement path such that it connects start and ending points of subdivided regions which are consecutive in work order according to the work order of the plurality of subdivided regions. In the example shown in FIG. 5(d), the path generation device 10 sets, for example, a first movement path M1 from the first ending point E1 of the first subdivided region DR1 to a second starting point S2 of a second subdivided region DR2.

Figure 6:
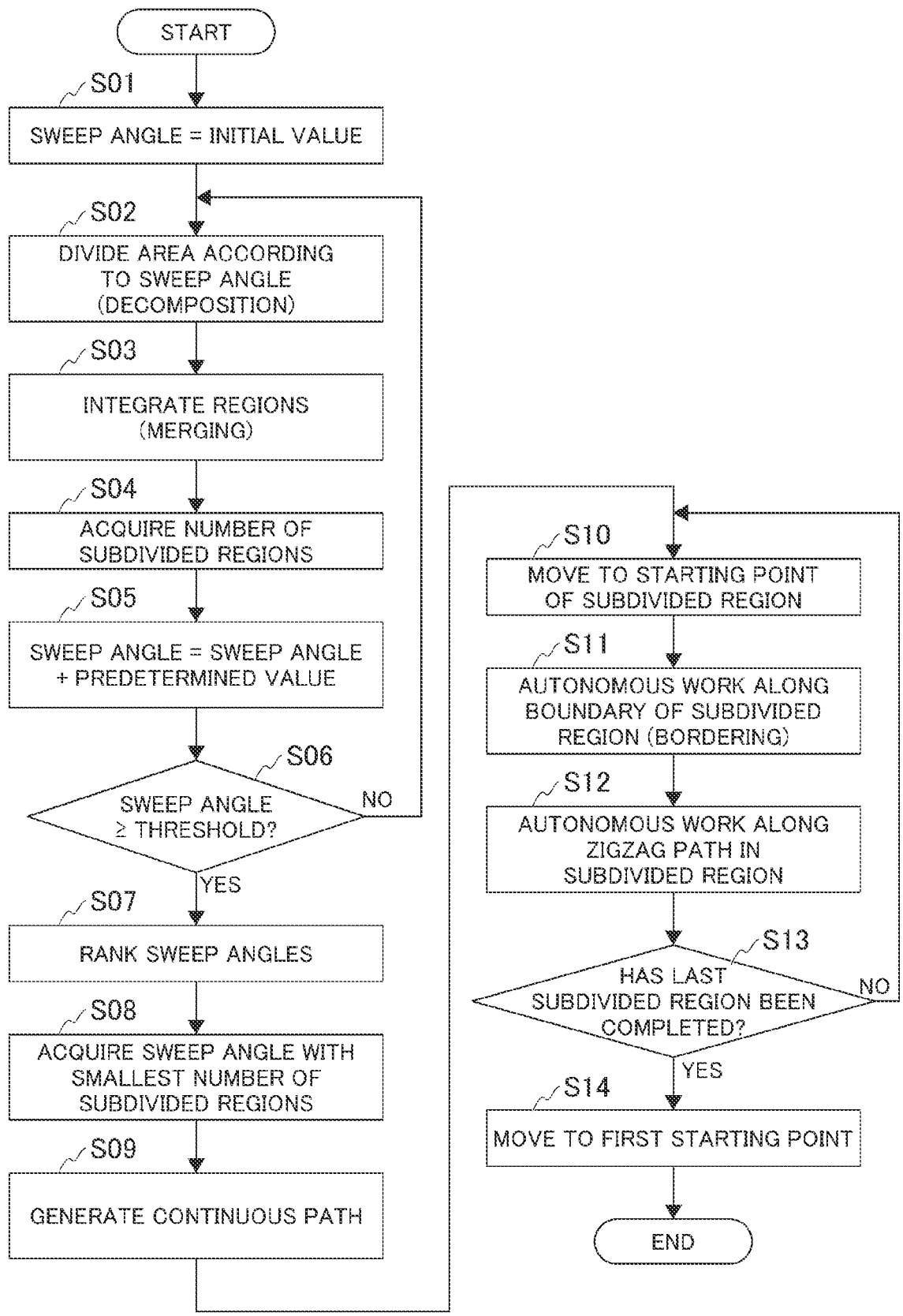
FIG. 6 is a flowchart showing the operation of the work system according to the embodiment of the present invention.

FIG. 6 is a flowchart showing the operation of the work system 1 according to the embodiment.

First, in step S01 shown in FIG. 6, the processing unit 13 of the server 100 sets the sweep angle θ to a predetermined initial value such as 0°.

Next, in step S02, while moving a straight sweep line SL along a sweep direction SD corresponding to the sweep angle θ on map data of an appropriate work area WA, the processing unit 13 detects a critical point at which the connectivity of the straight sweep line SL changes to form a plurality of subdivided regions constituting the work area WA.

Next, in step S03, the processing unit 13 shortens straight sweep lines SL forming each subdivided region to integrate a plurality of subdivided regions.

Next, in step S04, the processing unit 13 acquires the number of subdivided regions that constitute the work area WA.

Next, in step S05, the processing unit 13 sets a value obtained by adding a predetermined value, for example, 10° which is a predetermined angular increment from 0° to 180°, to the sweep angle θ as a new sweep angle θ.

Next, in step S06, the processing unit 13 determines whether or not the sweep angle θ is equal to or greater than a predetermined threshold. The predetermined threshold is, for example, 180 degrees.

If the determination result is "YES," the processing unit 13 advances the process to step S07.

On the other hand, if the determination result is "NO," the processing unit 13 returns the process to step S02.

Next, in step S07, the processing unit 13 ranks the plurality of different sweep angles θ based on the number of subdivided regions acquired for each of the plurality of different sweep angles θ. For example, the processing unit 13 sets the rank of a sweep angle θ having a relatively small number of subdivided regions constituting the work area WA to a high rank and sets the rank of a sweep angle θ having a relatively large number of subdivided regions constituting the work area WA to a low rank.

Next, in step S08, the processing unit 13 acquires a sweep angle θ with the highest rank such as a sweep angle θ with the smallest number of subdivided regions that constitute the work area WA.

Next, in step S09, the processing unit 13 uses a path along which the mobile work machine 300 is to work (a work path) in each subdivided region and paths required for movement between the plurality of subdivided regions (movement paths) to generate a continuous path required for work over the entire work area (a continuous path).

Next, in step S10, the processing unit 40 of the mobile work machine 300 moves the mobile work machine 300 to a starting point of a subdivided region to be worked according to the work order of the plurality of subdivided regions based on continuous path information that has been received from server 100 via the communication network NW.

Next, in step 511, the processing unit 40 causes the mobile work machine 300 to perform predetermined work while moving it along an inner edge work path of the subdivided region to be worked.

Next, in step S12, the processing unit 40 causes the mobile work machine 300 to perform predetermined work while moving it along an inner work path throughout the inside of the inner edge work path.

Next, in step S13, the processing unit 40 determines whether or not the predetermined work has been completed on a last subdivided region according to the work order of the plurality of subdivided regions.

If the determination result is "YES," the processing unit 13 advances the process to step S14.

On the other hand, if the determination result is "NO," the processing unit 13 returns the process to step S10.

Next, in step 511, the processing unit 40 moves the mobile work machine 300 to a starting point of a first subdivided region according to the work order of the plurality of subdivided regions. Then, the processing unit 40 ends the process.

A simulation of a series of operations of the work system 1 will be described below. A series of operations of the work system 1 includes generation of a continuous path for an appropriate work area by the path generation device 10, movement of the mobile work machine 300 along the generated continuous path, and execution of work. A simulator that performs a simulation of the work system 1 may be provided, for example, in the path generation device 10. The simulator is constructed, for example, by partially modifying a general-purpose robot operating system (ROS) such as "TurtleSim." The simulator sets a plurality of areas relating to the work of the mobile work machine 300, for example, based on appropriate map data. The plurality of areas include, for example, a work area which is an entire area where work is to be performed, an external area which is outside the work area and where it is unnecessary to perform work, a worked area where work has already been performed in the work area, an obstacle area which impedes work in the work area, and boundaries between a plurality of subdivided regions that constitute the work area. For example, each of the plurality of areas is associated with different color information. A mobile body that simulates the movement of the mobile work machine 300 in the work area and the presence or absence of work includes, for example, a sensor that detects and identifies color information associated with the plurality of areas.

For example, by simulating each of a plurality of different sweep angles θ, the simulator acquires various types of information such as the number of subdivided regions that constitute a work area, the length of a work path including an inner edge work path and an inner work path, the length of a movement path, the time required to move along the work path, the time required to move along the movement path, the number of turns on the work path, the coverage of the work area (=(work area−unworked area)/work area), and the length of the work path divided by the coverage.

The various types of information include, for example, parameters for evaluating the degrees of satisfaction of predetermined requirements for a continuous path. The predetermined requirements include, for example, limiting damage to the work area, improving work finish, and improving work efficiency. To limit damage to the work area, it is required, for example, to perform work in as nearly one move as possible, and not to move to a specific location more than once. To improve work finish, it is required, for example, to move in as a uniform direction as possible, to maintain an appropriate work overlap width, and to reduce an unworked portion at the boundary of the work area or around an obstacle or the like. To improve work efficiency, it is required, for example, to reduce the moving distance and the number of turns.

Figure 7:
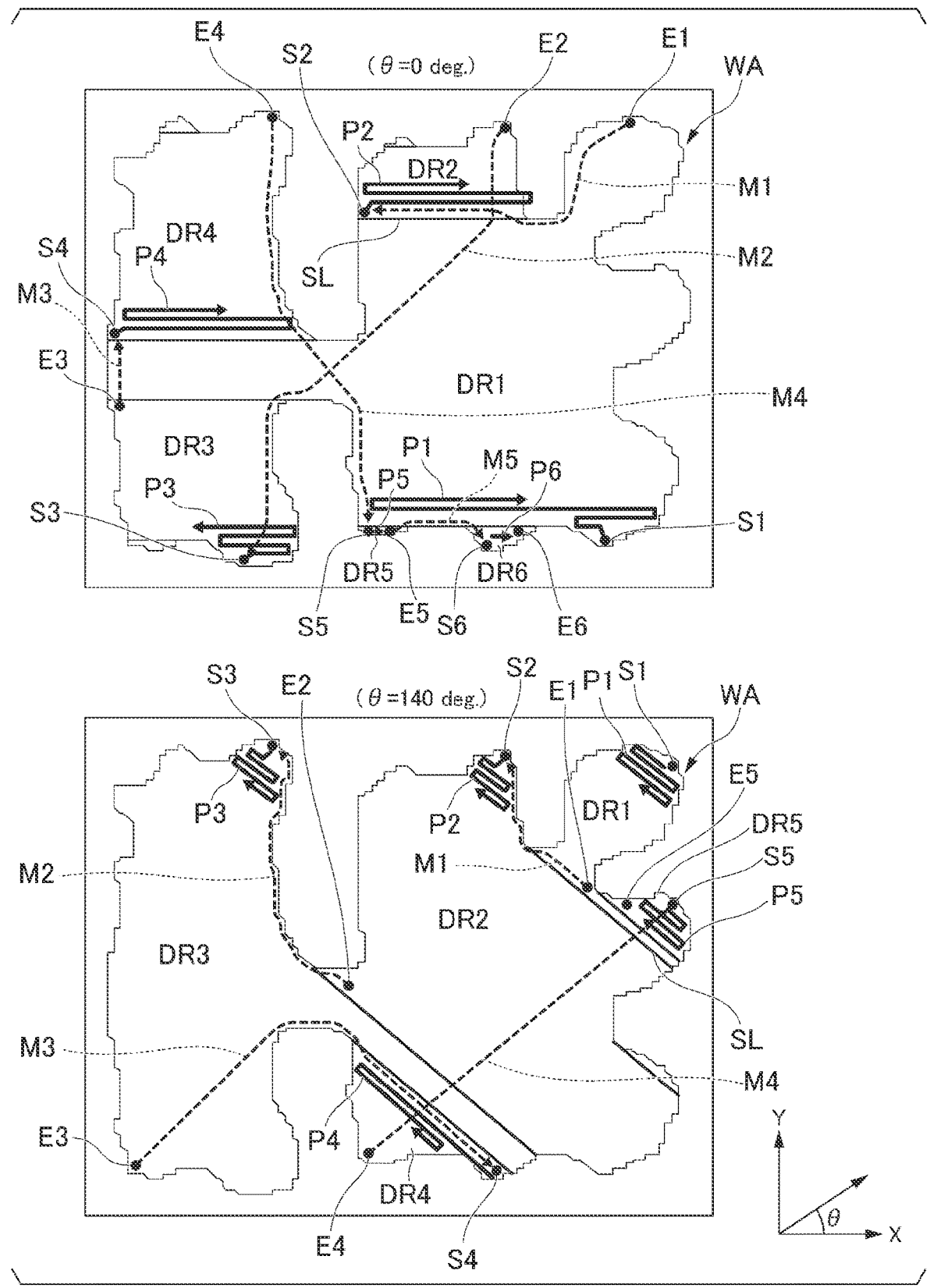
FIG. 7 is a diagram showing examples of paths for different subdivided regions generated by simulation of the work system according to the embodiment of the present invention.

FIG. 7 is a diagram showing examples of paths for different subdivided regions generated by simulation of the work system 1 according to the embodiment.

In the example shown in FIG. 7, for example, a plurality of subdivided regions formed by a plurality of straight sweep lines (for example, first to sixth subdivided regions DR1 to DR6), work paths in the subdivided regions (for example, first to sixth inner work paths P1 to P6), and movement paths between a plurality of subdivided regions (for example, first to fifth movement paths M1 to M5) are set for each of the sweep angles θ of 0° and 140°.

Through simulation of the work system 1 for each of a plurality of different sweep angles θ as shown in FIG. 7, it was found that various parameters such as the length of each of work and movement paths, the time required to move along each of the work and movement paths, the number of turns on the work path, the coverage of the work area, and the length of the work path divided by the coverage are optimized when the number of subdivided regions constituting the work area WA is minimized.

As described above, the path generation device 10 of the embodiment can create, for example, subdivided regions having simple shapes by dividing a work area having a complicated shape or the like. The path generation device 10 can limit an increase in the number of subdivided regions (the number of subdivisions) by appropriately selecting a sweep angle θ for creating subdivided regions. For example, by minimizing the number of subdivided regions, the path generation device 10 can limit an increase in the distance of non-work paths (movement paths) other than work paths (paths for work) among the paths of the mobile work machine 300, thus improving work efficiency.

The path generation device 10 can limit an increase in the number of subdivided regions by integrating a plurality of predetermined adjacent subdivided regions into a new subdivided region, thus limiting an increase in the distance of movement paths.

The path generation device 10 can select a straight sweep line SL having an optimal sweep angle θ by setting sweep angles θ of straight sweep lines SL for area division at predetermined angular intervals from 0° to 180°.

The path generation device 10 makes straight paths of an inner work path in a subdivided region parallel to the straight sweep line SL, such that it is possible, for example, to limit a decrease in the proportion of the inside of the subdivided region which can be covered by the inner work path (the coverage), compared to when straight paths of an inner work path in a subdivided region are not parallel to the straight sweep line SL.

The path generation device 10 sets an end of the subdivided region in a normal direction of the straight sweep line SL that generates the subdivided region (a position on the inner edge of the boundary which maximizes the distance from the straight sweep line SL) as a start point of the work path, such that it is possible to limit the occurrence of an area (an unworked area) that cannot be covered by the inner work path in the subdivided region, for example, even though the straight paths of the inner work path in the subdivided region are parallel to the straight sweep line SL.

Modifications

Modifications of the embodiment will be described below. The same parts as those of the embodiment described above will be denoted by the same reference numerals and the description thereof will be omitted or simplified.

For example, in the embodiment described above, it is assumed that a region integration process is performed to integrate a plurality of subdivided regions as shown in FIG. 4 and step S03, but the present invention is not limited to this and a region integration process may be omitted. This can prevent calculation processing from becoming complicated.

In the embodiment described above, it is assumed that a work path in each of a plurality of subdivided regions that constitute a work area is constituted by combining straight line paths parallel to a straight sweep line and turnaround paths that turn back at both ends of the straight line paths, but the present invention is not limited to this. A work path in each subdivided region may be set, for example, such that the length of the path and the number of turns are minimized.

Figure 8:
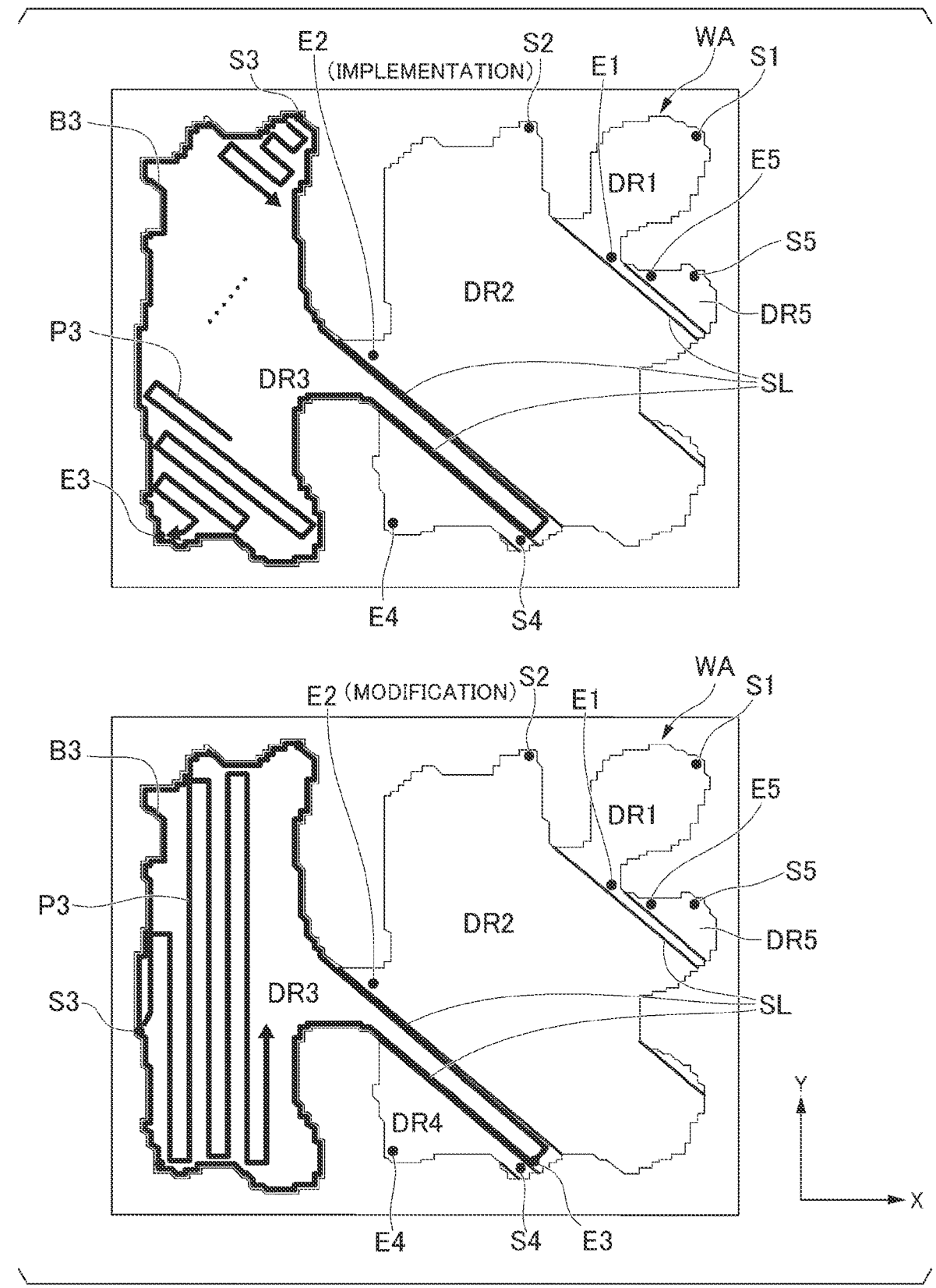
FIG. 8 is a diagram showing an example of a work path generated by an implementation of the path generation device according to the embodiment of the present invention and a work path generated by a modification.

FIG. 8 is a diagram showing an example of a work path generated by an implementation of the path generation device 10 according to the embodiment and a work path generated by a modification.

In the example shown in FIG. 8, a third inner work path P3 of each of the implementation and the modification is set inside a third inner edge work path B3 of a third subdivided region DR3. The third inner work path P3 of the implementation is formed by combining straight paths parallel to a straight sweep line SL and turnaround paths that turn back at both ends of the straight paths. The third inner work path P3 of the modification is formed by combining straight paths parallel to the Y-axis direction and turnaround paths that turn back at both ends of the straight paths, for example, such that the number of turns is minimized. A third starting point S3 which is a start point of the third inner work path P3 of the modification is, for example, an end of the third subdivided region DR3 in a normal direction of the straight paths of the third inner work path P3 of the modification.

Compared to the third inner work path P3 of the implementation, the third inner work path P3 of the modification has a smaller number of turns and longer straight paths between the turnaround paths, such that the entire length of the work path is relatively short and work efficiency can be improved.

In the embodiment described above, the path generation device 10 sets a continuous path for the case where the number of subdivided regions that constitute the work area is minimized as an optimal continuous path, but the present invention is not limited to this.

For example, the path generation device 10 may set an optimal continuous path by preferentially evaluating at least one of various parameters obtained by the simulation of the work system 1.

For example, the charging timing of the battery 36 of the mobile work machine 300 may be considered in the simulation of the work system 1. The path generation device 10 may set an optimal continuous path, for example, by evaluating the charging timing of the battery 36 of the mobile work machine 300 in addition to the various parameters.

In the embodiment described above, it is assumed that the mobile work machine 300 receives continuous path information from the path generation device 10 provided in the server 100 via the communication network NW, but the present invention is not limited to this. The mobile work machine 300 may acquire continuous path information, for example, by reading a recording medium in which the continuous path information is written by the path generation device 10.

In the embodiment described above, it is assumed that the path generation device 10 is formed by the storage unit 12 and the processing unit 13 of the server 100, but the present invention is not limited to this. The path generation device 10 may be provided in other devices, apparatuses, and the like without being limited to the server 100. For example, the path generation device 10 may be formed by other processing devices such as the processing unit of the communication terminal 200 and the processing unit 40 of the mobile work machine 300.

In the embodiment described above, subdivided regions having a size equal to or smaller than a predetermined threshold may be ignored when a work area is constituted by a plurality of subdivided regions in the simulation of the work system 1. The predetermined threshold is, for example, a value indicating the size of an area in which it is difficult for the mobile work machine 300 to move or perform work, such as an area width narrower than the working width of the mobile work machine 300 or a movement width required for the mobile work machine 300 to turn.

In the embodiment described above, when constituting a work area by a plurality of subdivided regions, the path generation device 10 may exclude the number of regions, which are generated by dividing the work area and whose areas are smaller than a predetermined threshold, from the number of subdivided regions. In this case, it is possible to suitably select a straight sweep line SL having a sweep angle θ that minimizes the number of subdivided regions, for example, by excluding the number of small regions in which it is difficult for the mobile work machine 300 to perform work from the number of subdivided regions.

For example, when the area of a region generated by dividing a work area is smaller than a predetermined threshold, the path generation device 10 may integrate this region into an adjacent subdivided region. In this case, it is possible to limit an increase in the unworked area.

In the embodiment described above, it is assumed that the mobile work machine 300 performs predetermined work while automatically or autonomously moving within a predetermined area, but the present invention is not limited to this. The mobile work machine 300 may move along a path generated by the path generation device 10 and perform work according to an operation performed by the operator.

In the embodiment described above, it is assumed that the mobile work machine 300 is a grass cutter, but the present invention is not limited to this and it may be other mobile work machines such as a weed cutter, a reaper, an agricultural machine, a cleaner, and a snow remover.

In the embodiment described above, the mobile work machine 300 may include an object detection device such as a sonar, a radar device, and a finder. The sonar, radar device, and finder radiate ultrasonic waves, electromagnetic waves, and light around the mobile work machine 300, respectively, and detect reflection or scattering by an object to detect the distance to or position of the object. The finder is, for example, a light detection and ranging or laser imaging detection and ranging (LIDAR) device.

All or a part of the process performed by the work system 1 according to the present invention may be performed by recording a program for implementing some or all of the functions of the work system 1 according to the present invention on a computer readable recording medium and causing a computer system to read and execute the program recorded on the recording medium. The "computer system" referred to here includes an OS or hardware such as peripheral devices. The "computer system" also includes a WWW system including a website providing environment (or display environment). The "computer readable recording medium" refers to a portable medium such as a flexible disk, a magneto-optical disc, a ROM, or a CD-ROM or a storage device such as a hard disk provided in a computer system. The "computer readable recording medium" includes one that holds the program for a certain period of time, like a volatile memory (RAM) provided in a computer system which serves as a server or a client when the program has been transmitted via a network such as the Internet or a communication line such as a telephone line.

The program may also be transmitted from a computer system in which the program is stored in a storage device or the like to another computer system via a transmission medium or by transmission waves in the transmission medium. Here, the "transmission medium" for transmitting the program refers to a medium having a function of transmitting information, like a network (a communication network) such as the Internet and a communication line (a communication wire) such as a telephone line. The program may be one for implementing some of the above-described functions. The program may also be a so-called differential file (differential program) which can implement the above-described functions in combination with a program already recorded in the computer system.

The embodiments of the present invention have been presented by way of example and are not intended to limit the scope of the invention. These embodiments can be implemented in various other forms, and various omissions, substitutions, and changes can be made without departing from the spirit of the invention. These embodiments and modifications thereof are included in the scope or spirit of the invention as well as in the scope of the invention described in the claims and their equivalents.

EXPLANATION OF REFERENCES

10 Path generation device
11 Communication unit
12 Storage unit
13 Processing unit
31 Communication unit
32 Positioning signal receiver
33 Camera
34 Sensor
35 Input/output unit
36 Battery
37 Blade drive unit
38 Travel drive unit
39 Storage unit
40 Processing unit
41 Control unit
42 Calculation unit
100 Server
200 Communication terminal
300 Mobile work machine

What is claimed is:

1. A path generation device comprising a processing unit configured to, when dividing a work area set for a work machine by a plurality of straight lines having different angles relative to a reference angle, divide the work area by a straight line having an angle that minimizes a number of subdivided regions generated by dividing the work area among the plurality of straight lines to generate a path for the work machine,
set an integrated region obtained by integrating a plurality of predetermined adjacent subdivided regions among the plurality of subdivided regions as new subdivided regions and divide the work area by a straight line having an angle that minimizes the number of the new subdivided regions to generate the path for the work machine, and
based on the path, cause the work machine to move along the path.

2. The path generation device according to claim 1, wherein the processing unit is configured to divide the work area by the plurality of straight lines which are at predetermined angular intervals from 0° to 180° relative to the reference angle.

3. The path generation device according to any one of claims 1 to 2, wherein the processing unit is configured to generate a path in a subdivided region generated by dividing the work area parallel to a straight line having an angle that minimizes the number of subdivided regions among the plurality of straight lines.

4. The path generation device according to claim 3, wherein the processing unit is configured to set an end of the subdivided region in a direction orthogonal to the straight line having the angle that minimizes the number of subdivided regions as a start point of the path in the subdivided region.

5. The path generation device according to claim 1, wherein the processing unit is configured to, when dividing the work area by each of the plurality of straight lines, exclude the number of regions, which are generated by dividing the work area and whose areas are smaller than a predetermined threshold, from the number of subdivided regions.

6. A path generation device comprising a processing unit configured to, when dividing a work area set for a work machine by a plurality of straight lines having different angles relative to a reference angle, generate a path for the work machine in a subdivided region generated by dividing the work area parallel to a straight line having an angle that minimizes a number of subdivided regions among the plurality of straight lines,
  set an integrated region obtained by integrating a plurality of predetermined adjacent subdivided regions among the plurality of subdivided regions as new subdivided regions and divide the work area by a straight line having an angle that minimizes the number of the new subdivided regions to generate the path for the work machine, and
  based on the path, cause the work machine to move along the path.

7. The path generation device according to claim 6, wherein the processing unit is configured to divide the work area by a straight line having an angle that minimizes the number of subdivided regions among the plurality of straight lines to generate a path for the work machine.

8. The path generation device according to claim 6, wherein the processing unit is configured to divide the work area by the plurality of straight lines which are at predetermined angular intervals from 0° to 180° relative to the reference angle.

9. The path generation device according to claim 6, wherein the processing unit is configured to set an end of the subdivided region in a direction orthogonal to the straight line having the angle that minimizes the number of subdivided regions as a start point of the path in the subdivided region.

10. The path generation device according to claim 6, wherein the processing unit is configured to, when dividing the work area by each of the plurality of straight lines, prevent the number of subdivided regions from including the number of regions which are generated by dividing the work area and whose areas are smaller than a predetermined threshold.

11. A path generation method performed by an electronic device including a processing unit configured to generate a path for a work machine, the path generation method comprising:
  the electronic device dividing, when dividing a work area set for the work machine by a plurality of straight lines having different angles relative to a reference angle, the work area by a straight line having an angle that minimizes a number of subdivided regions generated by dividing the work area among the plurality of straight lines to generate the path,
  setting an integrated region obtained by integrating a plurality of predetermined adjacent subdivided regions among the plurality of subdivided regions as new subdivided regions and divide the work area by a straight line having an angle that minimizes the number of the new subdivided regions to generate the path for the work machine, and
  based on the path, causing the work machine to move along the path.

12. A path generation method performed by an electronic device including a processing unit configured to generate a path for a work machine, the path generation method comprising:
  the electronic device generating, when dividing a work area set for the work machine by a plurality of straight lines having different angles relative to a reference angle, the path in a subdivided region generated by dividing the work area, parallel to a straight line having an angle that minimizes a number of subdivided regions among the plurality of straight lines to generate a path for the work machine,
  setting an integrated region obtained by integrating a plurality of predetermined adjacent subdivided regions among the plurality of subdivided regions as new subdivided regions and divide the work area by a straight line having an angle that minimizes the number of the new subdivided regions to generate the path for the work machine, and
  based on the path, causing the work machine to move along the path.

13. A non-transitory computer-readable storage medium storing a program causing a computer for an electronic device including a processing unit configured to generate a path for a work machine to perform:
  dividing, when dividing a work area set for the work machine by a plurality of straight lines having different angles relative to a reference angle, the work area by a straight line having an angle that minimizes a number of subdivided regions generated by dividing the work area among the plurality of straight lines to generate the path,
  setting an integrated region obtained by integrating a plurality of predetermined adjacent subdivided regions among the plurality of subdivided regions as new subdivided regions and divide the work area by a straight line having an angle that minimizes the number of the new subdivided regions to generate the path for the work machine, and
  based on the path, causing the work machine to move along the path.

14. A non-transitory computer-readable storage medium storing a program causing a computer for an electronic device including a processing unit configured to generate a path for a work machine to perform:
  generating, when dividing a work area set for a work machine by a plurality of straight lines having different angles relative to a reference angle, the path in a subdivided region generated by dividing the work area, parallel to a straight line having an angle that minimizes a number of subdivided regions among the plurality of straight lines to generate a path for the work machine,
  setting an integrated region obtained by integrating a plurality of predetermined adjacent subdivided regions among the plurality of subdivided regions as new subdivided regions and divide the work area by a straight line having an angle that minimizes the number of the new subdivided regions to generate the path for the work machine, and
  based on the path, causing the work machine to move along the path.

* * * * *